(12) United States Patent (10) Patent No.: US 8,391,452 B2
Krantz et al. (45) Date of Patent: Mar. 5, 2013

(54) USER-BASED AUTHENTICATION FOR REALTIME COMMUNICATIONS

(75) Inventors: Anton W. Krantz, Redmond, WA (US); Amey Parandekar, Redmond, WA (US); Vadim Eydelman, Bellevue, WA (US); Sankaran Narayanan, Redmond, WA (US); Namendra Kumar, Bellevue, WA (US); Sachin Sheth, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 12/432,773

(22) Filed: Apr. 30, 2009

(65) Prior Publication Data

US 2010/0278322 A1 Nov. 4, 2010

(51) Int. Cl.
*H04M 11/00* (2006.01)
(52) U.S. Cl. ............... 379/93.03; 379/90.01; 379/93.05
(58) Field of Classification Search ............... 379/93.03, 379/90.01, 93.05, 93.07, 88.17, 207.13; 370/356, 370/352, 401, 353, 354, 355
See application file for complete search history.

(56) References Cited

U.S. PATENT DOCUMENTS

| 5,745,574 | A  | * | 4/1998 | Muftic | 713/157 |
|---|---|---|---|---|---|
| 6,549,612 | B2 |   | 4/2003 | Gifford et al. | |
| 6,847,704 | B1 | * | 1/2005 | Cherchali et al. | 379/93.05 |
| 7,006,605 | B1 |   | 2/2006 | Morganstein et al. | |
| 2002/0124057 | A1 |   | 9/2002 | Besprosvan | |
| 2005/0153699 | A1 | * | 7/2005 | Kent et al. | 455/445 |
| 2005/0180408 | A1 |   | 8/2005 | Mangetsu | |
| 2006/0168162 | A1 | * | 7/2006 | Woundy | 709/220 |
| 2006/0206709 | A1 |   | 9/2006 | Labrou et al. | |
| 2007/0115934 | A1 | * | 5/2007 | Dauster et al. | 370/352 |
| 2008/0013712 | A1 |   | 1/2008 | Gopinath | |
| 2008/0137644 | A1 | * | 6/2008 | Reynolds et al. | 370/352 |
| 2009/0073962 | A1 | * | 3/2009 | Muttagi | 370/352 |
| 2009/0177585 | A1 | * | 7/2009 | Eskicioglu et al. | 705/67 |
| 2010/0191973 | A1 | * | 7/2010 | Huntzicker et al. | 713/176 |

OTHER PUBLICATIONS

"LDAP Directory Integration", Retrieved at <<http://www.cisco.com/en/US/docs/voice_ip_comm/cucm/srnd/6x/directry.html>>, Dec. 29, 2008.
"Configuring Call-Control Integration for Cisco Unified MeetingPlace Express with Cisco Unified Communications Manager", Retrieved at <<http://www.cisco.com/en/US/docs/voice_ip_comm/meetingplace_express/2_0/english/administration/guide/cm20call.html>>, Dec. 29, 2008.
Masterson, Joey., "White Paper: Managing Exchange 2007 Unified Messaging—Part 3", Retrieved at <<http://technet.microsoft.com/en-us/library/bb738123.aspx>>, Sep. 2007.
"Avaya IP Office Conferencing Solutions", Retrieved at <<http://www.cablenet.com.tr/dosyalar/Conferencing%20Solutions.pdf>>.
"Cisco Unity 4.2 for Microsoft Exchange", Retrieved at <<http://www.cisco.com/en/US/prod/collateral/voicesw/ps6789/ps5745/ps2237/product_data_sheet0900aecd800fe148.html>>, Dec. 29, 2008.
"International Search Report", Mailed Date: Dec. 2, 2010, Application No. PCT/US2010/032303, Filed Date: Apr. 23, 2010, pp. 8.

* cited by examiner

*Primary Examiner* — Melur Ramakrishnaiah

(57) ABSTRACT

Architecture for a communications system enabling a user to provision a telephone at a new location without network administrative pre-configuring. An input component (e.g., keypad) receives a numeric extension and PIN. The extension is a telephone extension of the user and the PIN can be administratively assigned. A location component provides location information of an enterprise communications server to the telephone based on the extension. The telephone uses the location information to send messages to the enterprise communications server. A registration component registers the telephone with the enterprise communications server based on the numeric extension. A telephony address is returned to the telephone. An authentication component authenticates the telephone based on the PIN. Upon authentication, the extension is assigned to the telephone, and telephone communications can be sent and received from that location.

20 Claims, 16 Drawing Sheets

USER-BASED AUTHENTICATION FOR REALTIME COMMUNICATIONS

BACKGROUND

With convergence in communications media, a variety of different modes of communication, including voice, video, instant messaging, and conferencing, can be unified around a single user identity. A communications application running on a computer can employ the same identity used by the user for logging on to the computer. The user identity is typically a login username and password combination, each of which can include strings of alphanumeric characters that are typically entered into a computer keyboard.

Devices such as IP (Internet protocol) telephones can also be connected to the same network as the computer, and therefore, typically use the same username/password combination as a user identity for login. When an IP phone is first provisioned for a particular location (e.g., a new office assignment), the user identity is entered directly by the user, in order for the phone to be provisioned to the network. However, an IP telephone does not include a computer keyboard, but rather a twelve-key numeric keypad, for example. It can be a cumbersome and error-prone process for a user to enter an equivalent text code corresponding to a username and password using the telephone keypad.

Other approaches to provisioning are known. For example, hardware-specific information can be used, such as using the media access control (MAC) address of the IP telephone device, which is a physical characteristic of the phone. The MAC address of the device is assigned to a specific telephone line in the network. However, this is not easy to provision and typically requires an administrator or other telephony support to correlate the MAC address with a user's telephone extension. This increases the cost of user provisioning, especially in enterprises where users are frequently moved from one physical location to another. Additionally, in this approach, the IP phone device itself does not contain the user identity, so a separate database is required to link the device identity to the user identity, which further increases the cost of the deployment.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for enabling a user to provision an IP telephone at a new location, without the need for additional telephony support from an administrator. The user is assigned a numeric user identifier (e.g., a full telephone number, extension number, etc.) and provided with a numeric PIN (personal identification number) to identify the user in the communication system. The user identifier and PIN are associated with the user identity so that upon entry of the user identifier and the PIN, the system looks up the username and a certificate issued by the server. The phone then uses the certificate to subsequently authenticate and logon to the enterprise communications server.

The communications system includes an input component of a telephone, which can be the telephone keypad, for inputting the user extension and PIN. The communications system receives the user identifier and a PIN from the telephone. The telephone is provisioned to a telephony infrastructure based on the extension and PIN. The provisioning can include registering the telephone with an enterprise communications server and sending a telephony address to the telephone based on the user identifier. The telephone is authenticated to the enterprise communications server based on the PIN.

Alternatively, the PIN can be used to enroll for other credentials that can be used to authenticate to the server. In this manner, provisioning of a telephone is linked with the user identity to enable automatic discovery of a telephone service without requiring specification of the domain of the service. The credentials used to logon to a computer are used to authenticate the user at a new location and route calls to and from the user, without pre-configuration from an administrator. When a user enters the numeric user identifier and PIN, a network server dynamically looks up the associated user, determines the phone used by the user, and returns the user identity to the phone. The phone then authenticates the user based on the extension and PIN or uses the user identity to enroll for credentials on behalf of the user. The user can then use the phone at that location until either a new user provisions the phone at the same location, or provisions multiple phones at different locations, for example.

In yet another embodiment, the telephone can be provided a certificate that once verified and signed, can be use for telephone authentication for all subsequent connections after the initial connection provisioning process.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
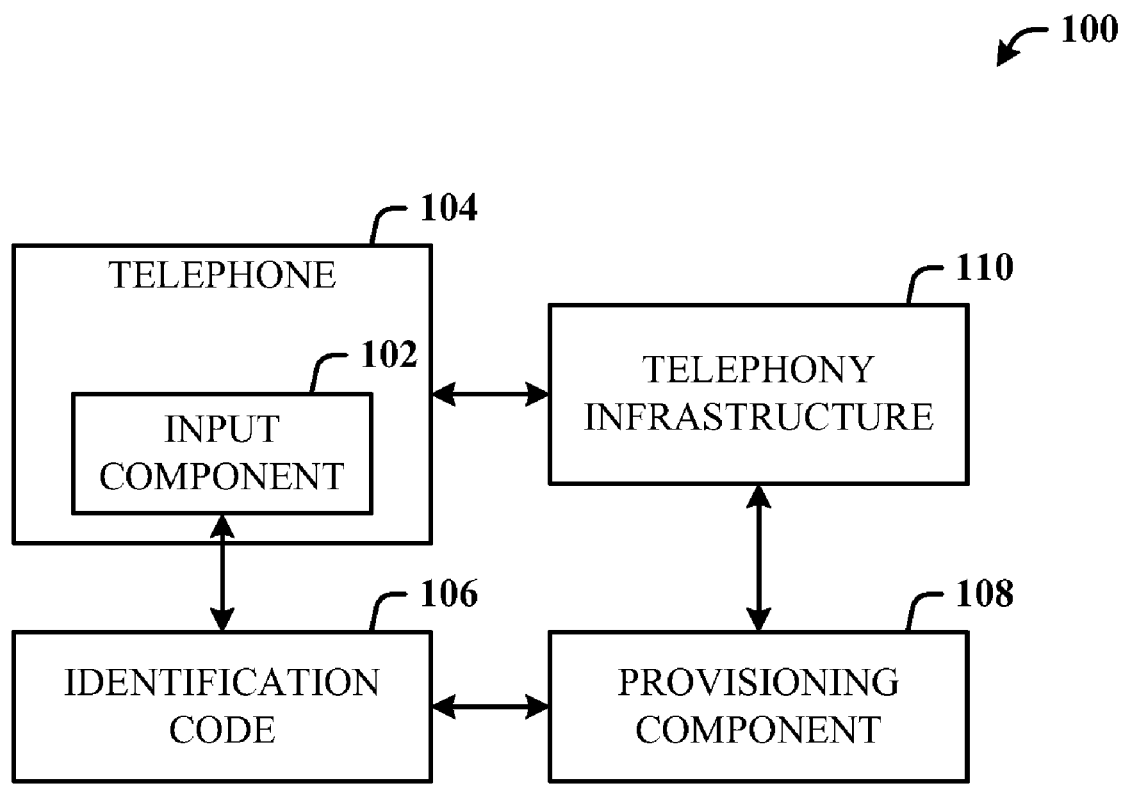
FIG. 1 illustrates a computer-implemented system for performing communications.

The disclosed communications architecture enables a user to provision a telephone at a new or existing location without network administrative pre-configuration. A numeric user identifier (e.g., a phone number or extension) and PIN (personal identification number) are inputted via a telephone keypad. Location information of an enterprise communications server is provided to the telephone based on the extension. The location information can include a fully qualified domain name (FQDN) and an IP address. The location information can be provided automatically via DHCP and does not require the user to enter a number and PIN. The telephone uses the location information to send messages to the enterprise communications server.

The telephone is registered with the enterprise communications server based on the numeric user identifier. Alternatively, the server can use the PIN to retrieve a user identity which the phone then uses to enroll for credentials which can be validated by the communications server. In addition to the telephone, the aforementioned approach can be extended to video terminals, electronic whiteboards, room-based conferencing systems, etc. A telephony address (e.g., user's SIP URI, Tel URI), is returned to the telephone. The telephone is authenticated based on the PIN. Upon authentication, realtime telephone communications can be sent and received from that location.

The enterprise communications server can be an IP server and the telephony address can be a session initiation protocol (SIP) uniform resource identifier (URI) (e.g., nobody@nowhere-domain.com) for sending SIP messages to the enterprise communications server. The telephony address can also be a telephone URI (e.g., 111-222-3333@nowhere-domain.com). The numeric user identifier can be a personal telephone number or extension of a user and a property of a network identity of the user. The PIN can be pre-assigned to the user, for example, by a network administrator or other entity.

A dynamic host configuration protocol (DHCP) server is provided for returning an IP address and a domain name system (DNS) record of the enterprise communications server to the telephone. The DHCP server need not be configured to return the location of the enterprise communications server, which can perform certain functions of the DHCP server and return its location (FQDN and IP address) in a DHCP response. Authentication can be performed by the enterprise communications server, for referencing the telephony address with the PIN.

Reference is now made to the drawings, wherein like reference numerals are used to refer to like elements throughout. In the following description, for purposes of explanation, numerous specific details are set forth in order to provide a thorough understanding thereof. It can be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for performing user-based authentication for realtime communications in accordance with the disclosed architecture. An input component 102 of a telephone 104 is used to input an identification code 106. The input component 102 can be, but is not limited to, a multi-digit (e.g., 3×4) telephone numeric keypad having keys corresponding to the numbers 0-9 and also other characters and symbols * and #, for example, as well as multi-function capability for the keys. It is to be appreciated that any suitable keypad or alphanumeric input system can be used without departing from the disclosed embodiments. The identification code can be an extension number and/or a PIN, where the extension number is the user's telephone extension within an enterprise organization where the user can be called. The PIN can be a numeric string initially assigned to the user during a network administrative configuration. The PIN can also be changed by the user for security purposes.

The system 100 also includes a provisioning component 108 for receiving the identification code 106 and provisioning the telephone 104 to a telephony infrastructure 110 based on the identification code 106. The provisioning component 108 accesses the user identity based on the identification code 106, and automatically performs the registration and authentication to enable the user extension to be assigned to a particular phone (wireline or wireless) within the enterprise. In this manner, the provisioning component 108 enables the user to provision the telephone 104 and thereby communicate through the telephony infrastructure 110 without the intervention of network administration.

Figure 2:
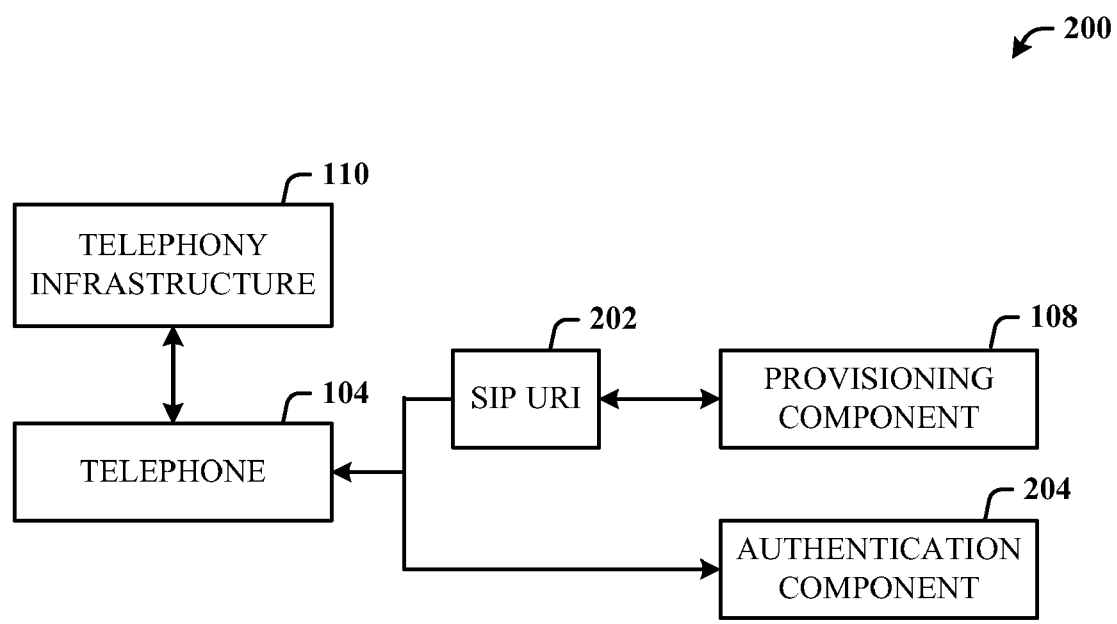
FIG. 2 illustrates a system that includes registration and authentication for performing realtime communications.

FIG. 2 illustrates a system 200 that includes registration and authentication for performing realtime communications. The provisioning component 108 assigns a SIP URI 202 to the telephone 104. The telephony infrastructure 110 is accessed based on the SIP URI 202 and the identification code 106. An authentication component 204 authenticates the telephone 104 to the telephony infrastructure 110 based on the identification code 106.

Figure 3:
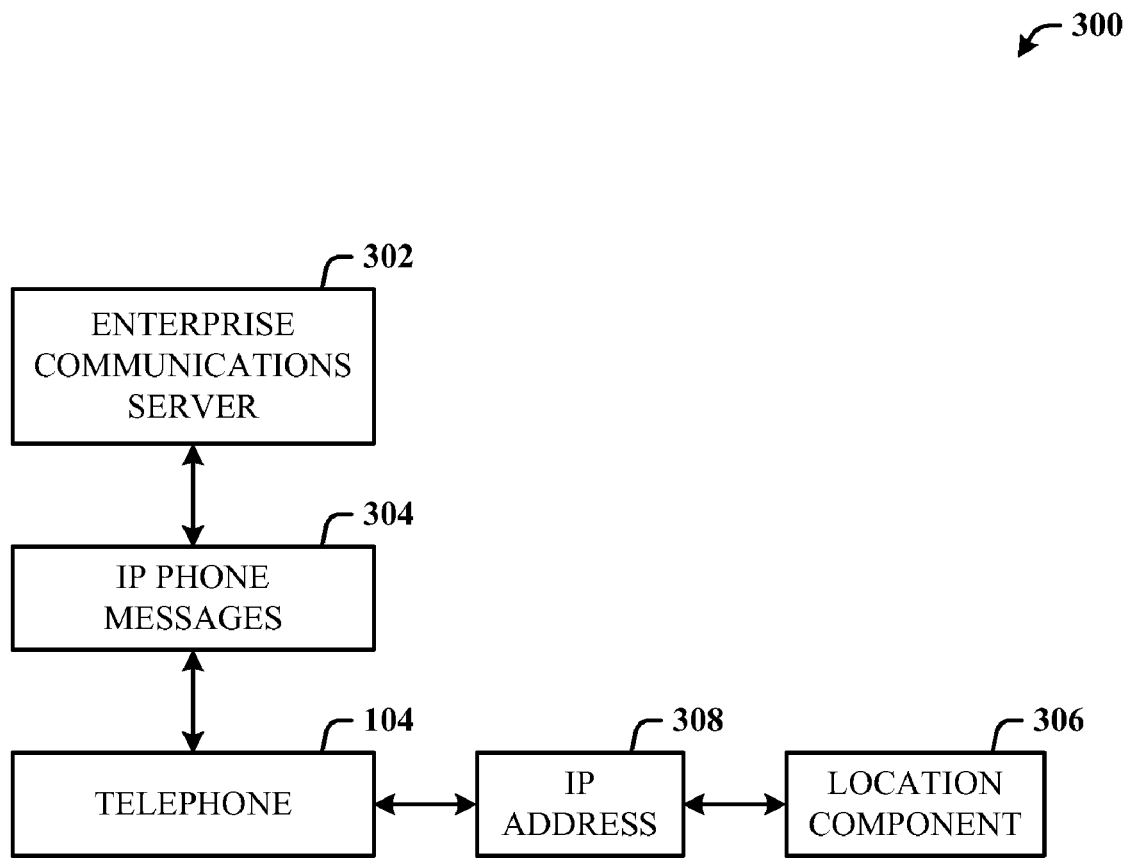
FIG. 3 illustrates additional components that can be employed in the system for performing user-based authentication in realtime communications.

FIG. 3 illustrates additional components 300 that can be employed in the system 100 for performing user-based authentication in realtime communications. The telephony infrastructure 110 can include an enterprise communications server 302 for processing IP phone messages 304. A location component 306 provides a domain name or an IP address 308 of the enterprise communications server 302 to the telephone 104.

Figure 4:
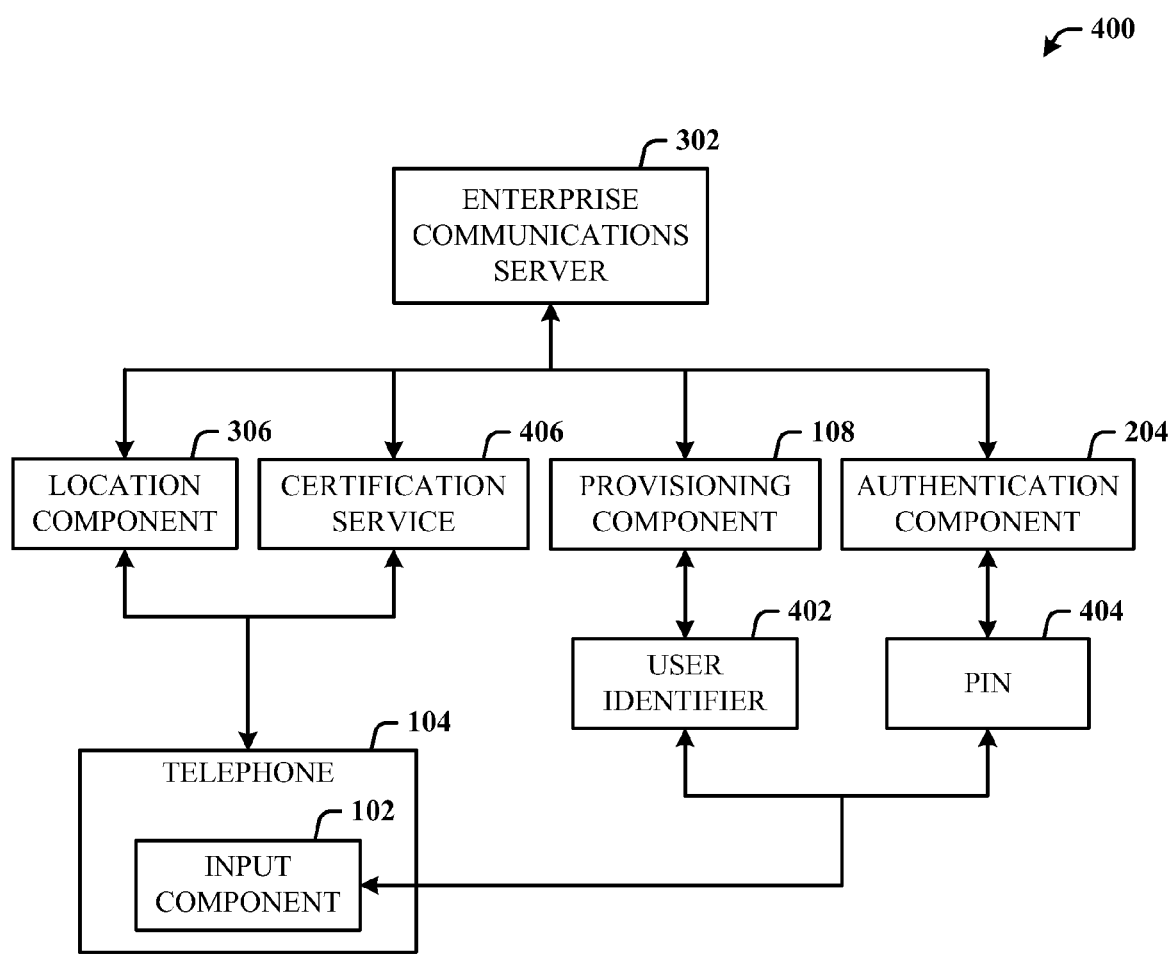
FIG. 4 illustrates an alternative embodiment of a system for performing user-based authentication.

FIG. 4 illustrates an alternative embodiment of a system 400 for performing user-based authentication. The input component 102 is employed for entering and receiving a numeric user identifier 402 (e.g., a phone number or extension) and PIN 404 via the telephone 104. The input component 102 can be a multi-button keypad of the telephone 104, for example, but it is to be appreciated that any suitable input interface can also be used. The user identifier 402 can be the user's personal telephone extension, and is a property of a network identity of the user as used within an enterprise telephony infrastructure. The user identifier 402 can also be used to define a location within the telephony infrastructure where the user can be reached.

As illustrated in FIG. 4, the PIN 404 is an individualized numeric code associated with the user that can be pre-assigned to the user. The PIN 404 can be changed by the user or an administrator to enhance security and/or to enable the user to select a different number more suitable for remembering, for example. The system 400 associates the user identifier 402 and PIN 404 with the user's network identity, which can be a username/certificate combination used to login and identify the user throughout the network.

As also illustrated in FIG. 4, the location component 306 provides location information of the enterprise communications server 302 to the telephone 104 based on the network of the user (e.g., subnet). In this way, the telephone 104 obtains an address of the enterprise communications server 302 to direct subsequent voice communications from the telephone 104.

The provisioning component 108 returns a telephony address to the telephone 104, so that the network telephone link for the current physical location of the telephone 104 can be associated with the user's specific telephone number designated by the extension 402.

As further illustrated in FIG. 4, the authentication component 204 authenticates the telephone 104 based on the PIN 404. The authentication component 204 looks up the PIN 404 against the username/password identity credentials associated with the PIN 404. The authentication component 204 uses the PIN 404 to verify that the user using the telephone 104 at the particular extension 402 is in fact the correct user assigned to the extension 402. Upon authentication, the user can send and receive telephone messages on the telephone 104 at the extension 402. In an alternative embodiment, the enterprise communications server 302 can request a certificate on behalf of a user and then return the certificate.

As still further illustrated in FIG. 4, a certification service 406 is provided for sending a certificate from the enterprise communications server 302 to the telephone 104. The certificate is used for subsequent authentication. The enterprise communications server 302 generates the certificate for sending back to the phone along with the telephony address (e.g., the SIP URI or telephone URI). The certificate is issued to the telephone 104 after authenticating using the numeric extension 402 and PIN 404, and subsequent authentication uses the certificate.

In the aforementioned manner, the telephone 104 can be provisioned a single time at startup. Provisioning can be updated if a user PIN expires or if login information changes in any way. The system 400 thus enables bootstrapping the telephone 104 to connect to the infrastructure.

Figure 5:
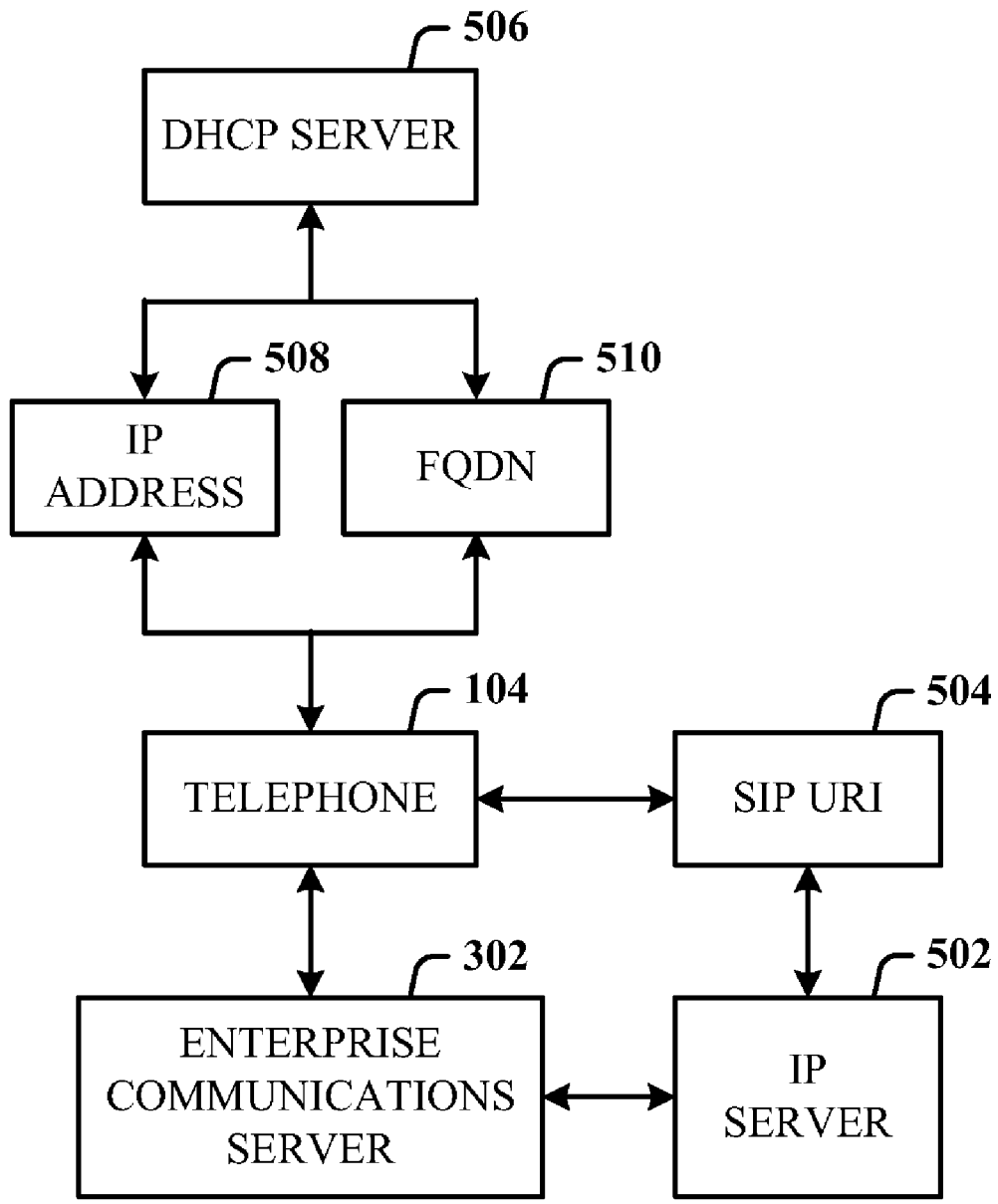
FIG. 5 illustrates additional entities of a system for performing user-based authentication.

FIG. 5 illustrates additional entities 500 of a system for performing user-based authentication. The enterprise communications server 302 can be an IP server 502 for IP telephony. In this way, the telephone 104 can be part of a network of IP telephones used within an internal enterprise network. The telephony address can include a SIP URI 504 for sending SIP messages to the IP server 502. The location component 306 previously described can include a dynamic host configuration protocol (DHCP) server 506 for returning an IP address 508 and a FQDN 510 of the IP server 502 to the telephone 104.

As illustrated in FIG. 5, the authentication functionality can be provided by the enterprise communications server 302 for authenticating the user based on the user PIN and sending an authentication message back to the IP server 502. The system 400 of FIG. 4 enables the user to provision the telephone 104 inside an enterprise network. Thus, it is not necessary to access a domain through the telephone 104 since the IP server 502 in the enterprise network can automatically recognize the domain.

Figure 6:
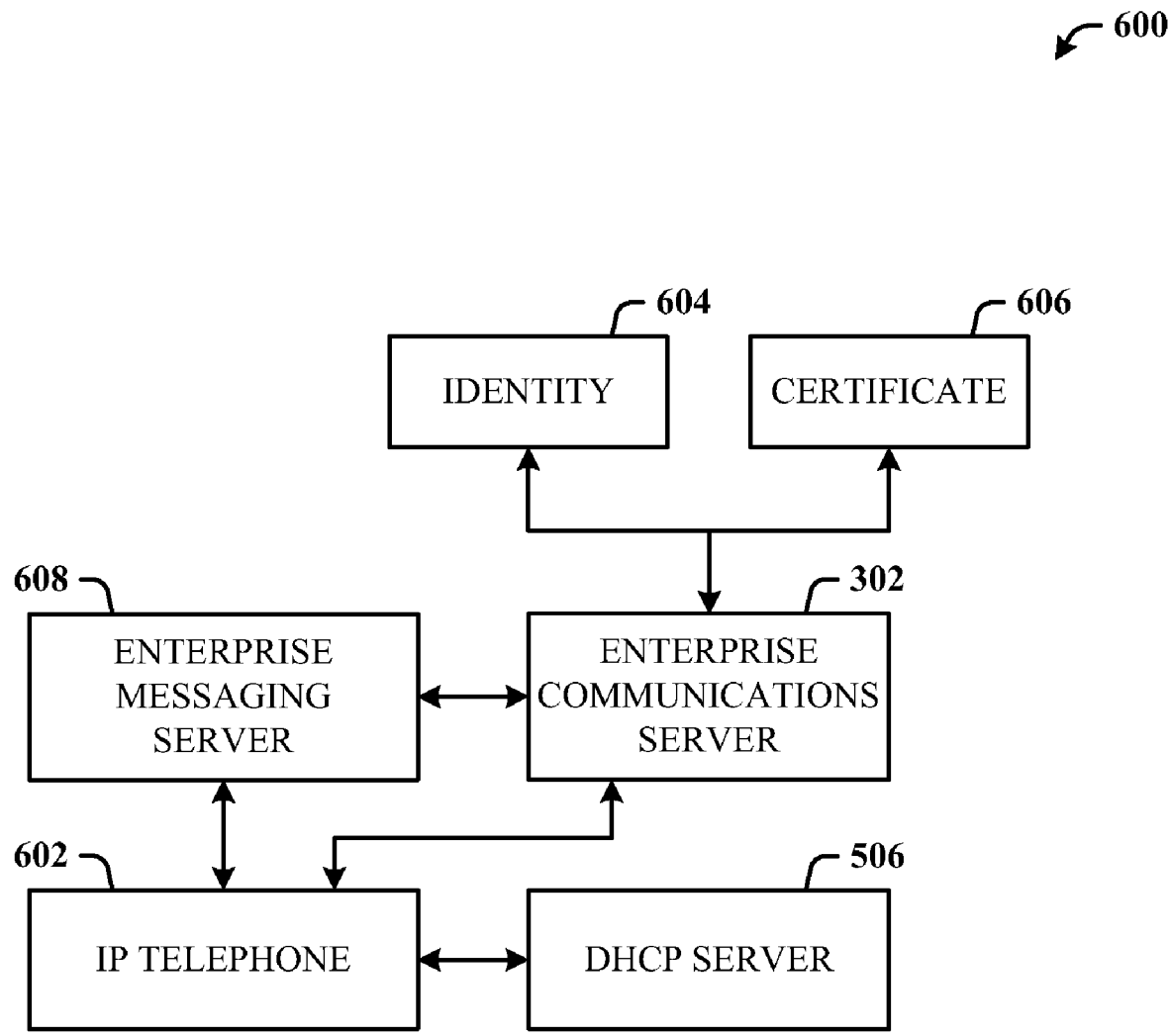
FIG. 6 illustrates an implementation of the system for performing user-based authentication.

FIG. 6 illustrates a generalized implementation of a system 600 for performing user-based authentication. The system 600 enables a user or administrator to enter a user PIN on the telephone to provision the telephone with the user identity. The system 600 enables PIN authentication using an IP telephone 602 connected to the enterprise communications server 302, which can be an IP server.

As illustrated in FIG. 6, the IP telephone 602 can include a numeric keypad. To provision the phone 602, the user enters an associated extension and corporate PIN via the keypad. The PIN is provided by an administrator and can be changed by the user. The PIN can be any suitable personal code, such as a unified messaging PIN for accessing multiple messaging services on a network. The extension is a property of the user identity.

Upon entering an extension and PIN, the phone 602 requests an IP address from the DHCP server 506. The DHCP server 506 returns to the phone 602 an IP address and a DNS record giving the location of the enterprise communications server 302. Upon receiving the location information, the IP phone 602 sends a registration request in the form of an http:// request that includes the user extension and PIN to the enterprise communications server 302.

Figure 7:
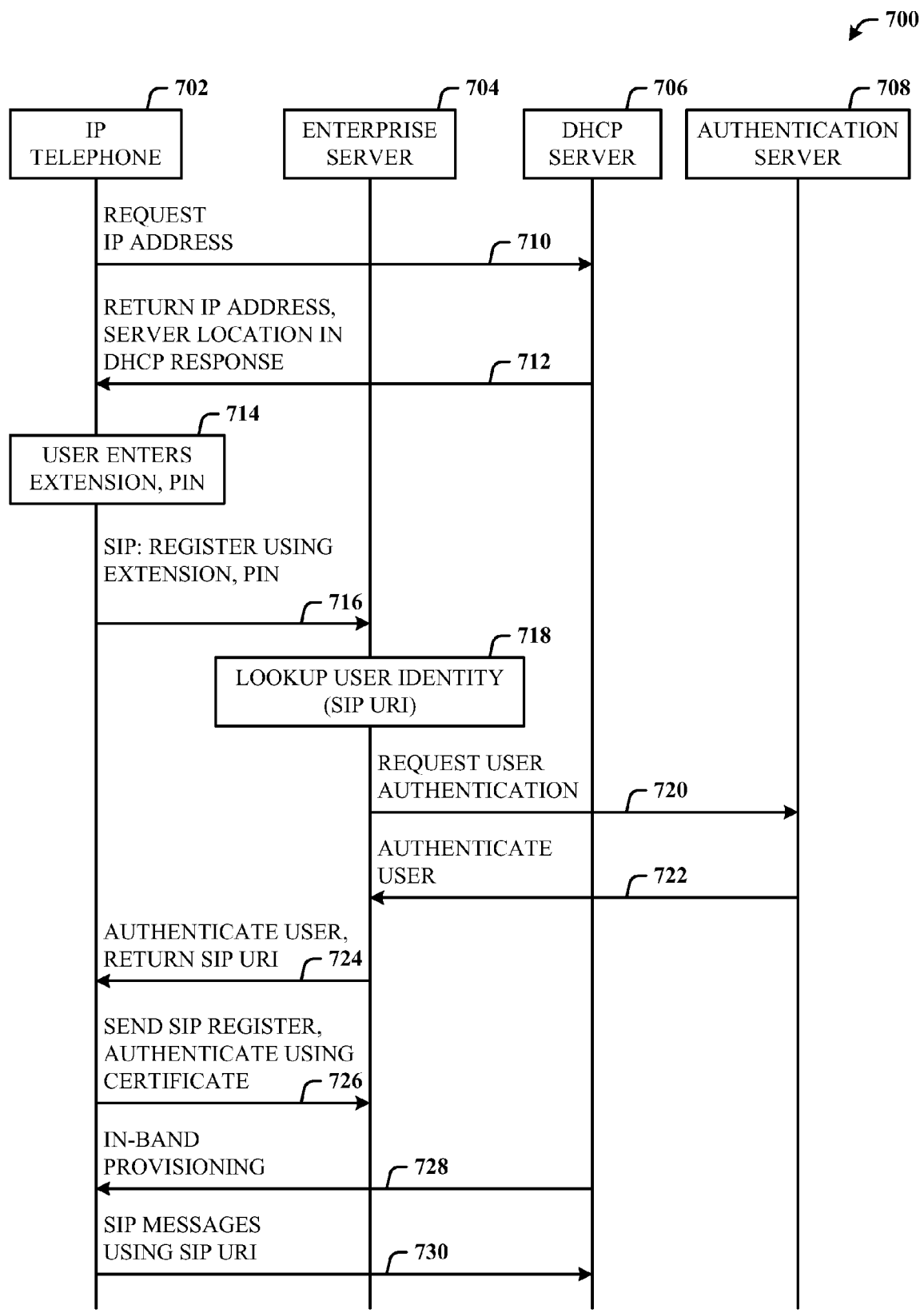
FIG. 7 illustrates a data and message flow diagram of the system for performing user-based authentication.

The enterprise communications server 302 accesses an identity 604 of the user (e.g., a SIP URI or telephone URI) based on the extension. The enterprise communications server 302 sends the identity 604 in a user authentication request to the enterprise communications server 302. The enterprise communications server 302 authenticates the user based on the user PIN and sends the identity 604 to the phone and also additionally sends back a certificate 606. The enterprise communications server 302 sends a response back to the IP phone 602 with the SIP URI. After obtaining the identity 604 (e.g., SIP URI or Tel URI), the phone 602 sends an SIP register request that includes the identity 604 and the certificate 606 to the enterprise communications server 302. The system 600 further includes a messaging server 608 for processing IP phone voice messages, FIG. 7 illustrates a data and message flow diagram 700 of the system for performing user-based authentication. The sequence diagram 700 shows how provisioning and authentication is achieved using PIN-based authentication. The diagram 700 illustrates communications between an IP telephone 702, an enterprise server 704, a DHCP server 706, and an authentication server 708. At 710, the telephone 702 requests an IP address from the DHCP server 706 upon connecting to a communications network. At 712, the DHCP server 706 returns the location of the enterprise server 704 to the IP telephone 702 so that the user does not need to provide a domain name for DNS discovery. Alternatively, the location can be returned by the enterprise server 704, itself.

At 714, the user enters an associated extension and PIN via the IP phone 702. This combination uniquely identifies the user to the enterprise server 704. At 716, the extension and PIN are sent to the enterprise server 704 included in an http:// message as part of a provisioning sequence. At 718, the enterprise server 704 uses the extension to retrieve the user SIP URI. This can be accomplished either by accessing the user extension in a local database on the enterprise server 704 or by sending a request to the authentication server 708.

At 720, the enterprise server 704 requests authentication of the user from the authentication server 708, which uses the PIN to authenticate the user at 722. At 724, the enterprise server 704 returns the SIP URI to the IP phone 702 as part of the provisioning response. At 726, the IP phone 702 sends a SIP register to the enterprise server 704, which authenticates the user using a certificate. At 728, the enterprise server 704 sends in-band provisioning to the IP phone 702. At 730, the IP phone 702 subsequently uses the SIP URI when sending SIP messages to DHCP server 706.

In addition to the aspects set forth hereinabove, rather than using an arbitrary line extension to retrieve a network domain, a system can be extended to include a full phone number. An external IP telephone network can be configured to enable a user to provision a telephone by the entering of the full phone number, including country code, area code, local exchange, and specific extension. This information can be entered along with a PIN to identify the user to the network, which can retrieve the authoritative domain associated with that number. In this way, the user can purchase an IP phone, plug it in, enter the numbers, and be provisioned without needing a telephone or cable technician to wire the phone at the user's home.

In addition to the aspects set forth hereinabove, user-performed provisioning can also be extended to a cell phone. For a cell phone operating under the global system for mobile communications (GSM), a network administrator gives a user a pre-provisioned SIM (subscriber identity module) card that can be inserted into a cell phone for enabling user-performed provisioning. For cell phones operating with a code division multiple access (CDMA) system, a network prompts the user upon initially powering up the phone. The user can enter a cell phone number and a PIN to provision the phone.

As described hereinabove, the DHCP server provides numerous configurable options that are can be leveraged. DHCP servers include an "option 120" that returns an FQDN to any endpoint that is connected to the DHCP server. Option 120 is used herein to send the domain to the telephone. The telephone then uses SRV (service) queries to find the server. For example, for a FQDN such as "nobody.com," the DHCP server can automatically discover the IP address of the sub-server for that FQDN. Upon retrieving the FQDN, the information is by the telephone to the enterprise server during the registration.

Figure 8:
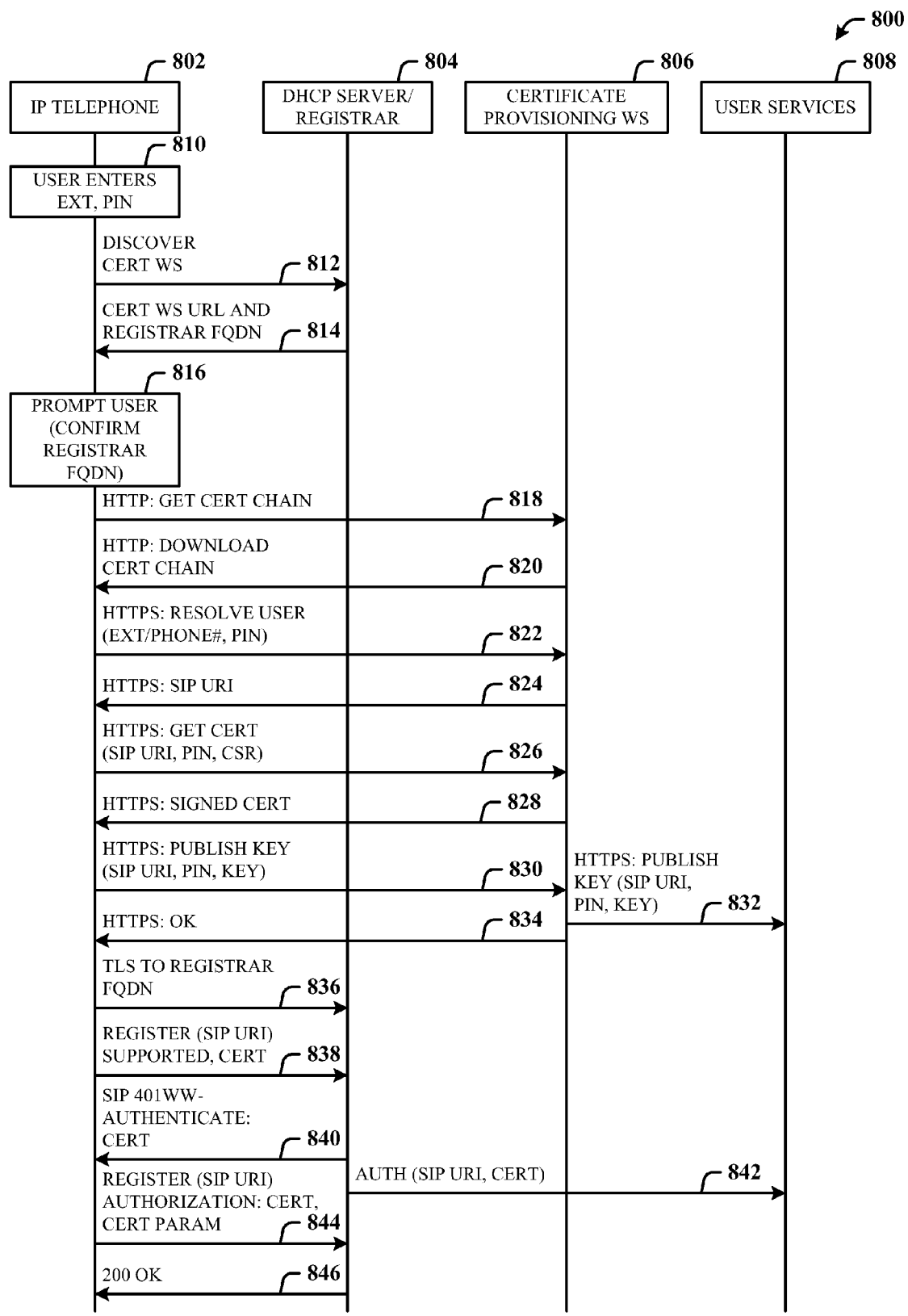
FIG. 8 illustrates a data and message flow diagram of an implementation of the system for performing user-based authentication.

FIG. 8 illustrates a data and message flow diagram 800 of the system for performing user-based authentication. The diagram 800 illustrates communications between an IP telephone 802, a DHCP server/registrar 804 (where the registrar is part of the enterprise communications server), a certificate provisioning web service 806, and a user service component 808. The IP telephone 802 can be "bootstrapped" on an internal network. A user is provided with a "clean" phone 802 which does not have an enterprise root certificate or chain. The phone 802 does not have an SIP URI of the user. However, the phone 802 contains a set of public certification authority root certificates included with an operating system. At 810, the user enters an extension or phone number and a PIN into the phone 802. At 812, the phone 802 discovers the network certificate provisioning web service 806 via a message to the DHCP server/registrar 804 (e.g., DHCP options 43 and 120). The DHCP server/registrar 804 can be an enterprise communications server that responds to DHCP queries. At 814, the registrar 804 responds to option 120 with an SIP registrar FQDN and option 43 with a URL of the certificate provisioning web service 806.

To mitigate a threat associated with a malicious user spoofing the DHCP server/registrar 804 and pointing the user to a rogue server, the phone 802 can prompt the user at 816 to confirm a suffix of the certificate provisioning web service 806 and the network registrar 804. At 818, the phone 802 connects to the certificate web service URL obtained through DHCP option 43. At 820, a certificate chain is downloaded from the certificate provisioning web service 806. At 822, the phone 802 connects through a secure server to the certificate provisioning web service 806 where the user submits the extension or phone number and PIN. At 824, the web service 806 looks up the SIP URI of the user, validates the PIN, and provisions the SIP URI to the phone 802.

At 826, the phone 802 creates a certificate signing request for submission to the web service. At 828, the web service stamps the appropriate expiration, SN/SAN (subject name/subject alternate name), etc., and issues a network signed certificate (signed with the web service private key). At 830, the phone 802 submits a public key in the network signed certificate to the web service. At 832, the public key is stored in the user services database. User services is the backend database of the enterprise communications server. At 834, an OK message is returned to the phone 802. This completes the provisioning process.

Once the SIP URI and network signed certificate of the user are provisioned to the phone, only the subsequent steps indicated hereinbelow are repeated for subsequent logon for access to the registrar 804 and the web service 806. At 836, the phone 802 sends a SIP message over transport layer security (TLS) to the registrar FQDN. At 838, the SIP URI and certificate of the phone 802 is sent to the registrar 804. At 840, the registrar 804 sends an authentication message to the phone 802. At 842, the registrar 804 authenticates the phone 802 to the user services component 808. At 844, the phone 802 registers the SIP URI with the certificate and parameters as authorization. At 846, the phone 802 receives an OK message, after which the user can use all the functionality available over the SIP channel.

After phone provisioning is complete, a user can tether the phone to the user computer and provision a user certificate to the phone in order to authenticate to other web services and obtain functionality such as call logs and voice mail list provided by an enterprise messaging server. The aforementioned process can be performed by a MAC (move, add, changes) technician instead of a user, for example. In this instance, there is no user certificate deployment.

The following section describes scenarios for implementing the herein disclosed embodiments. A first scenario is for internal desk phone provisioning and logon by an end user. A typical new employee uses the phone to call phone numbers such as the helpdesk without being signed-on to the enterprise network using authentication credentials. For example, if a user is not able to login with enterprise credentials, and seeks to call the helpdesk, the phone can be easily provisioned and used. The user cannot access a PIN management portal to set or reset the PIN as the user cannot authenticate to the enterprise network.

An administrator provisions a database element or directory with the name of the user, an extension/phone number and a SIP URI. The administrator also provisions a user mailbox and network account, and specifies a PIN or sets the PIN to "auto-generate." The user arrives at the office and sees a desk phone and a sheet with instructions on how to setup the phone. The user can also be handed a sheet with an extension/phone number and PIN. After the phone boots up, the user enters the extension/phone number and PIN using the phone keypad. The phone number can be the full E.164 phone number as published in the line URI (e.g., 1-ZZZ-XXX-YYYY for a user in the United States, and in India, 91-40-XXX-YYYY). The extension is the extension of the user as published in the line URI.

Upon entry of the extension/phone number and PIN, the phone discovers the network, which verifies the user using the extension/phone number and PIN. The network provisions the SIP URI (e.g., user@nowhere-domain.com) to the phone and provisions a network signed certificate that identifies the user (e.g., SN=user@nowhere-domain.com) to the phone. The network signed certificate is used for authenticating to the network registrar and web services. The user is prompted to create a device PIN. The user can use the same PIN or create a different PIN, which is used to unlock the phone.

As described hereinabove, the user can now use the phone to send and receive calls to and from any users within the enterprise or the PSTN (public-switched telephone network). The user does not have to enter a SIP URI, domain and password into the phone.

A second scenario relates to internal desk phone provisioning and logon by a technician. In certain industry verticals such as financial services and the government the phone is already deployed by a "Move-adds-changes" technician, and made operational before the end user arrives. For example, when a new trader arrives at the trading work desk in a financial services firm, an operational phone is expected.

For a new employee, an administrator provisions a directory with the employee name, phone number, and SIP URI. The administrator can also provision the mailbox and network account of the user, set the PIN to "auto-generate" and specifies that the PIN must be changed at a first-time user logon. The technician arrives at the work desk of the user, having already been provided the phone number and PIN of the user by the administrator, boots the phone, and enters the extension/phone number and PIN using the phone keypad. The phone discovers the network, which then verifies the extension/phone number and PIN. The network provisions the SIP URI of the user (e.g., user@nowhere-domain.com) to the phone and provisions a signed certificate that identifies the user (e.g., SN=user@nowhere-domain.com) to the phone. The signed certificate is used for authenticating to a network registrar and web services. The user can now use the phone to send and receive calls to and from other users.

A third scenario relates to desk phone logon from a remote location. Consider that the user is a mobile user that works from a home office. In order to provision the phone of the user for the first time, the phone is physically connected to the internal enterprise network. The user can visit a branch or headquarters of the company to provision the phone for the first time. Phone provisioning occurs as described hereinabove. When the user returns to the home office, a SIP URI and signed certificate (and/or user certificate) have already been provisioned into the phone. The client discovers the network server (e.g., an edge server) using a DNS SRV (service record), and connects to the edge server. The user authenticates to the network using the signed certificate (or user certificate) and can now use all phone functionality.

A fourth scenario relates to desk phone provisioning by pairing with a computer. Consider that the user is a mobile user that works from a home office. In order to provision a phone for the first time, the user connects (wirelessly or wired) the phone to an associated computer running network software. The phone requests a signed certificate (or user certificate) and uses a security authentication protocol (e.g., Kerberos/NTLM-NT LAN manager) credentials for the request. The network provisions a signed certificate to the phone (or user certificate). The network also provisions a SIP URI to the phone. The user authenticates to the network using the signed certificate (or user certificate) and can now use all phone functionality.

A fifth scenario relates to a "hot desk" or a cubicle desk phone that can be used by a visiting user in situations where enterprises do not have dedicated offices or desks for visiting users. For example, users can use the infrastructure available such as a docking station and phone. This scenario is common in the consulting industry, for example, where consultants are mobile, work from remote offices, but visit the home office infrequently.

For example, consider a corporate branch in London that has a limited number of offices such that mobile workers can drop in and uses the local infrastructure. The mobile user presses a logon button and, enters an extension/phone number and PIN. The phone discovers the network, which verifies the extension/phone number and PIN. The network provisions a SIP URI to the phone and provisions a signed certificate that identifies the user (e.g., SN=user@nowhere-domain.com) to the phone. The signed certificate is used for authenticating to network registrar and web services. The user can now use the phone to send and receive calls to and from any users within the enterprise or the local PSTN network using the SIP identity. When the mobile user leaves the location, the user can log out using the phone, or the phone can be configured to log off automatically after a predetermined period of time (e.g., minutes). Another mobile user can now visit the London, office and utilize the communications infrastructure according to the described procedure.

A sixth scenario relates to common area phone provisioning and logon. Common area phones are typically low-end devices that can be deployed in common areas such as lobby, reception area, conference rooms, hallways, etc. An administrator creates a common area phone identity in a communications database. The administrator sets the PIN or "auto-generate" for the common area phone number. Common area PINs can be defined to have a separate expiration policy than user PINs. For example, an administrator can set a common area phone PIN to "never expire."

A technician can then visit the common area, connect the phone, and enter the extension/phone number and the PIN for the common area phone. The phone discovers the network, which verifies the extension/phone number and PIN. The network then provisions a Tel URI (which describes resources identified by telephone numbers) to the phone and provisions a signed certificate that identifies the Tel URI (e.g., SN=4257070030@nowhere-domain.com) to the phone. The signed certificate is used for authenticating to network registrar and web services. The common area phone is now operational and can be used to send and receive calls (using the phone identity—Tel URI). In common area mode, the phone does not have any user specific data thereon.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology can be required for a novel implementation.

Figure 9:
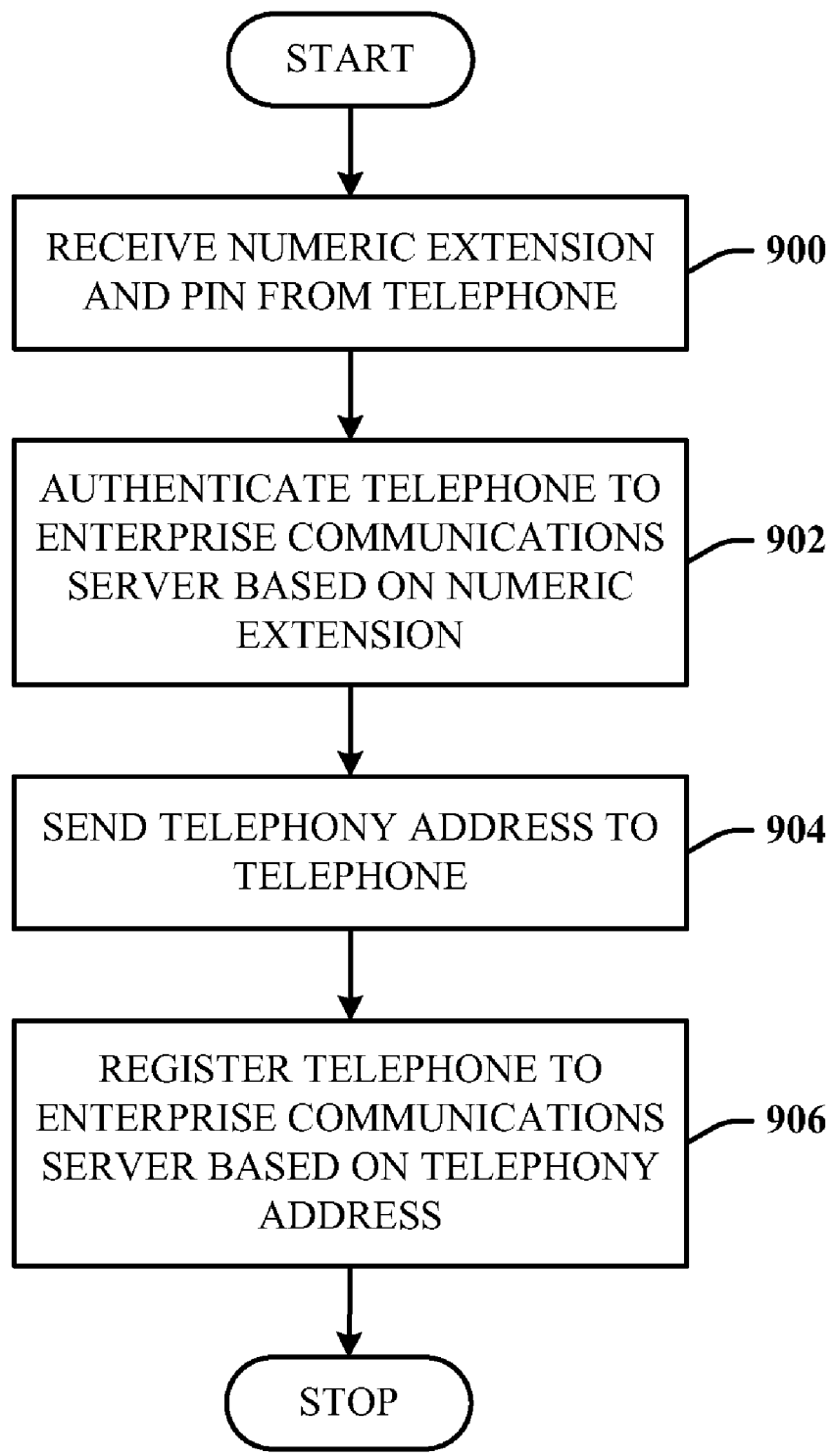
FIG. 9 illustrates a method of user-based authentication in realtime communications.

FIG. 9 illustrates a method of user-based authentication in realtime communications. At 900, a numeric extension and a PIN are received from a telephone. The extension can be a telephone extension where a user can be reached. The PIN can be any administratively-assigned personal code that can be changed by the user. The extension and PIN can be entered by the user into a numeric keypad on the telephone. At 902, the telephone is authenticated to an enterprise communications server based on the numeric extension. At 904, a telephony address is sent to the telephone. At 906, the telephone is registered to the enterprise communications server based on a telephony address (e.g., a SIP URI or telephone URI and the certificate).

Figure 10:
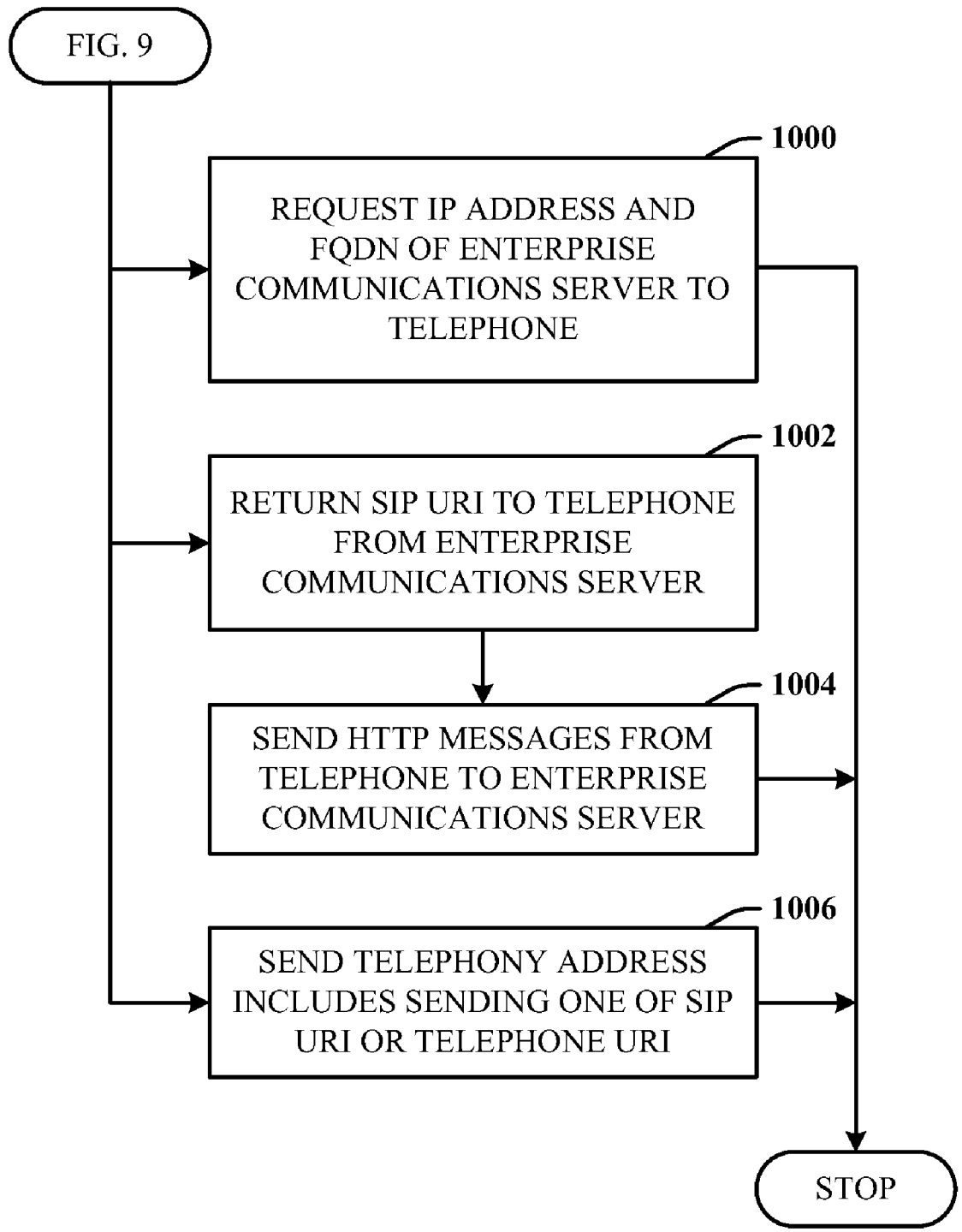
FIG. 10 illustrates further aspects in the method of user-based authentication.

FIG. 10 illustrates further aspects in the method of user-based authentication. At 1000, an IP address and an FQDN of the enterprise communications server are requested for the telephone. At 1002, a SIP URI is returned to the telephone from the enterprise communications server. At 1004, HTTP messages are sent from the telephone to the enterprise communications server. At 1006, the telephony address is one of an SIP URI or a telephone URI.

Figure 11:
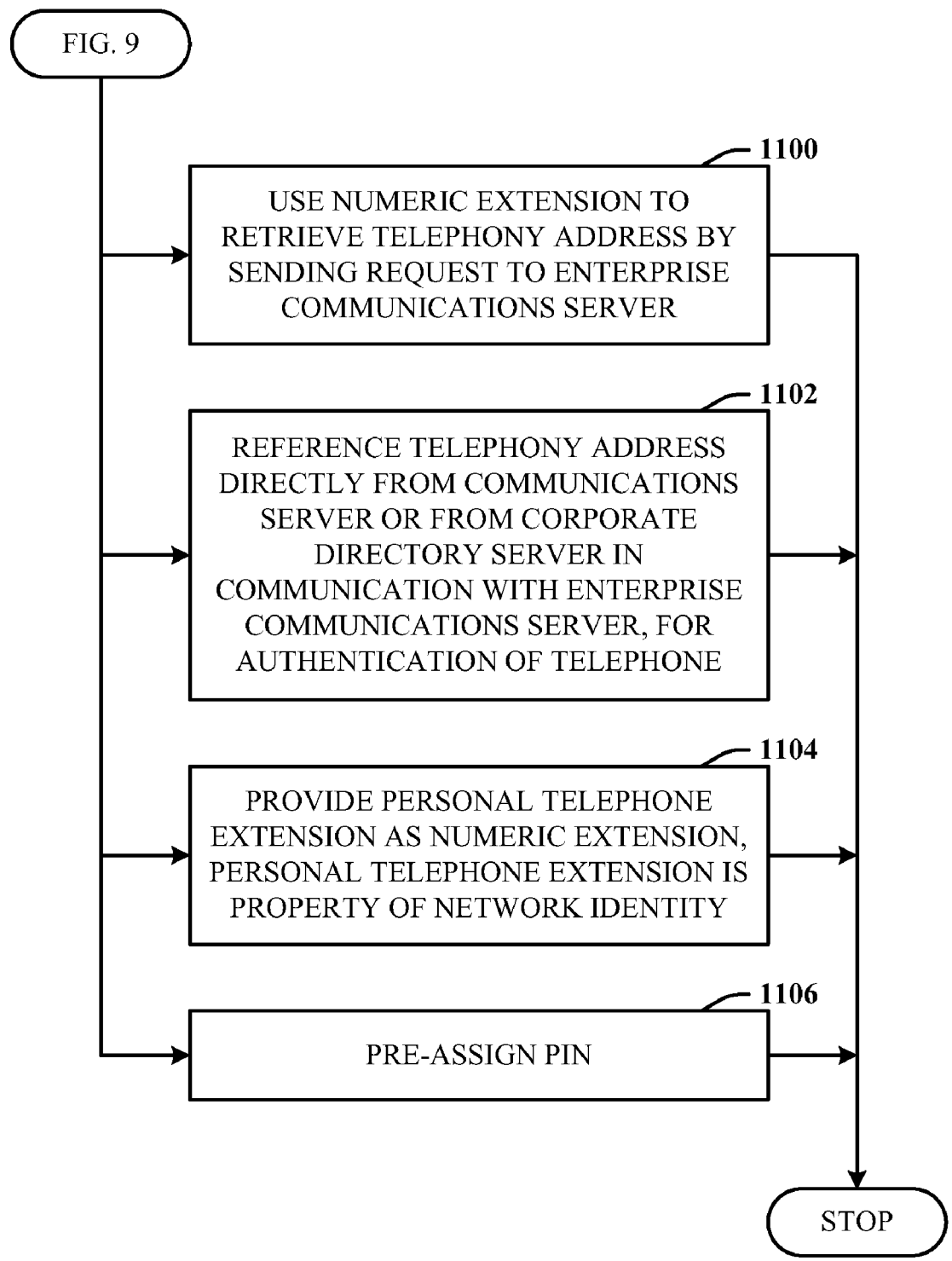
FIG. 11 illustrates additional aspects in the method of user-based authentication.

FIG. 11 illustrates additional aspects in the method of user-based authentication. At 1100, the numeric extension is used to retrieve the telephony address by sending a request to enterprise communications server. At 1102, the telephony address is referenced directly from the communications server or from a corporate directory server in communication with the enterprise communications server, for authentication of the telephone. At 1104, a personal telephone extension is provided as the numeric extension. The personal telephone extension is a property of a network identity of a user. At 1106, the PIN is pre-assigned (e.g., as part of network administration).

Figure 12:
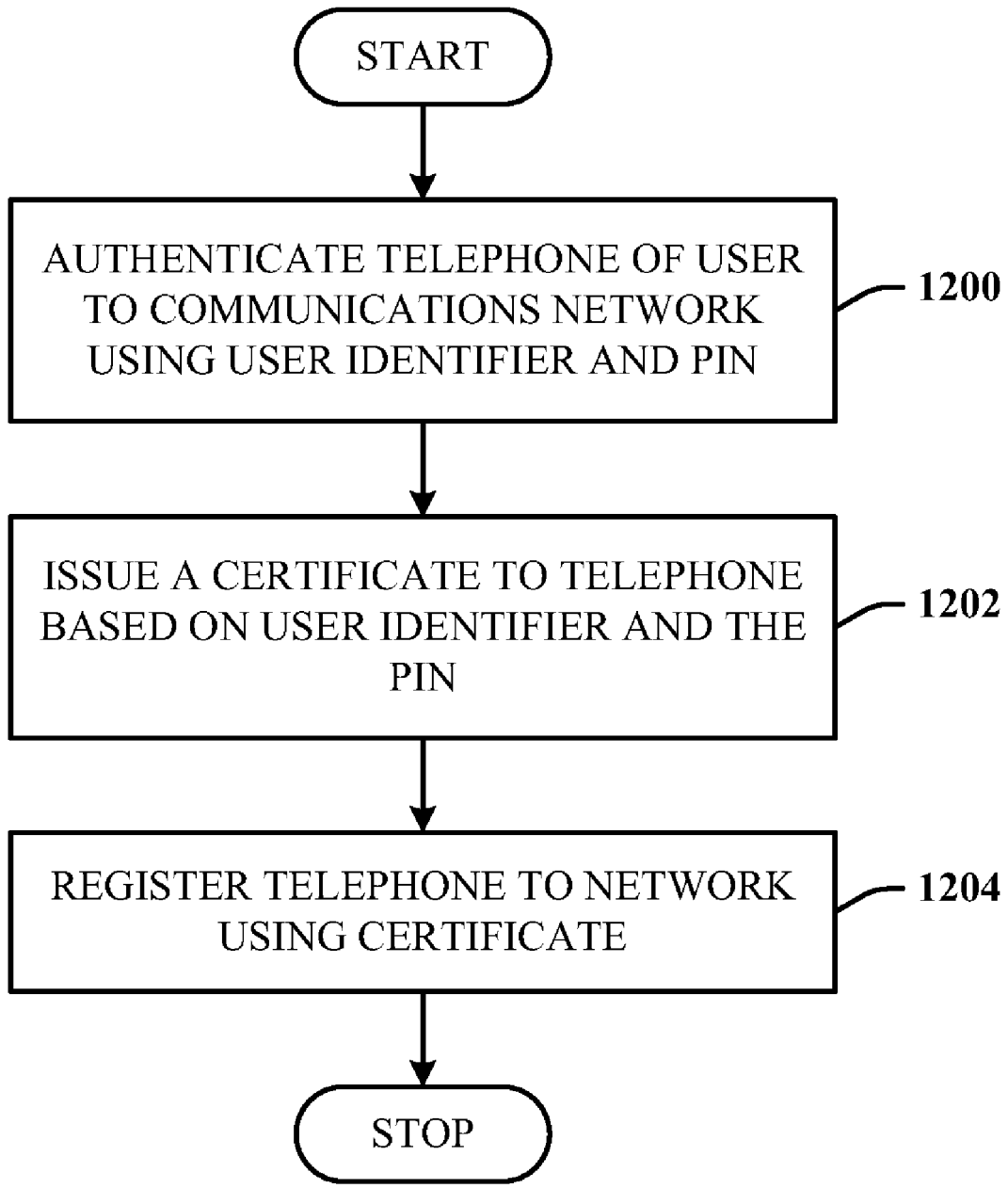
FIG. 12 illustrates a method of communications that employs a certificate.

FIG. 12 illustrates a method of communications that employs a certificate. At 1200, a telephone of a user is authenticated to a communications network using a user identifier and PIN. At 1202, a certificate is issued to the telephone based on the user identifier and the PIN. At 1204, the telephone is registered to the network using the certificate.

Figure 13:
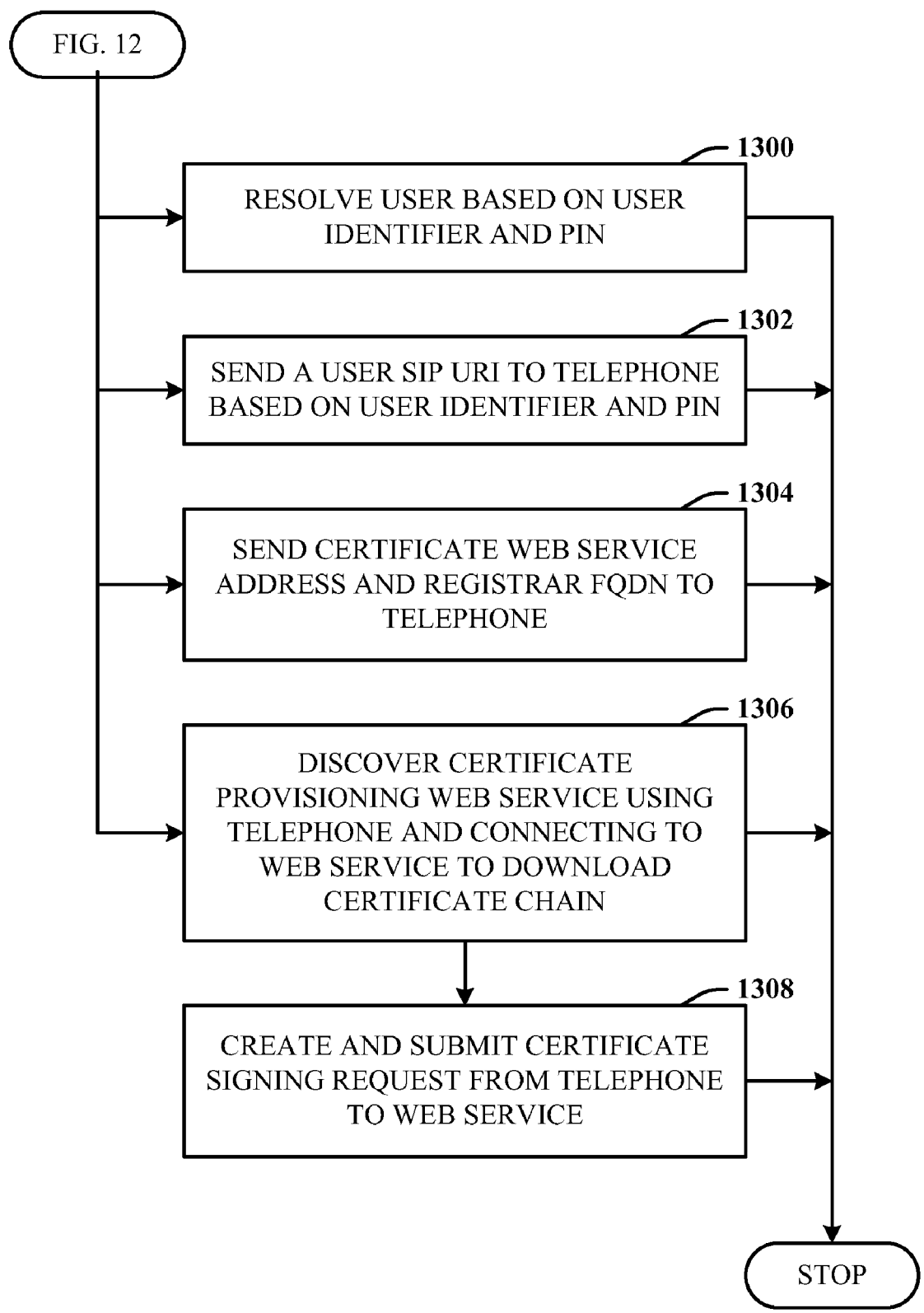
FIG. 13 illustrates additional aspects of the method of communications of FIG. 12 that employs a certificate.
Figure 14:
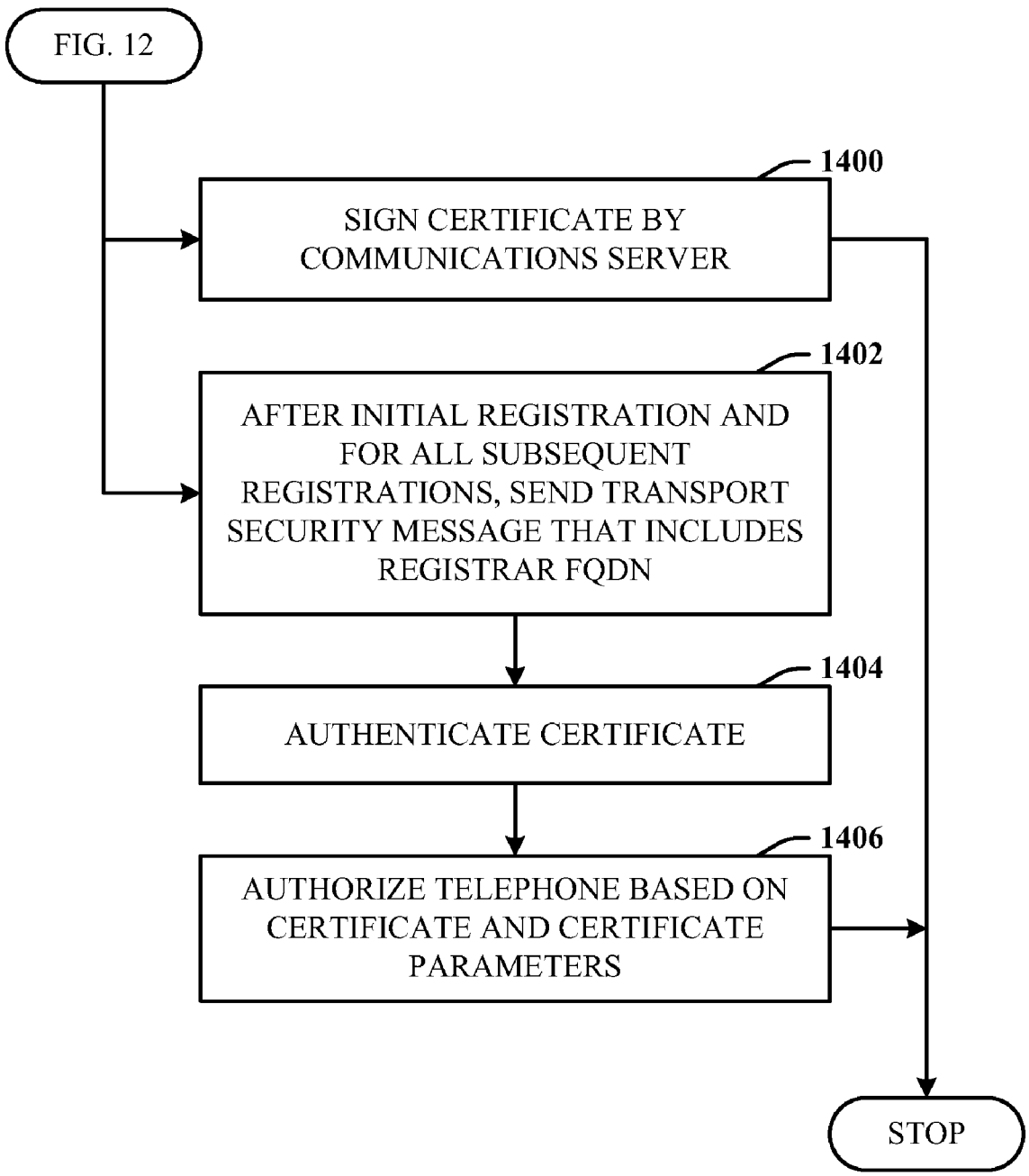
FIG. 14 illustrates additional aspects of the method of communications of FIG. 12 that employs a certificate.

FIG. 13 illustrates additional aspects of the method of communications of FIG. 12 that employs a certificate. At 1300, the user is resolved based on the user identifier and PIN. At 1302, a user SIP URI is sent to the telephone based on the user identifier and the PIN. At 1304, a certificate web service address and registrar FQDN is sent to the telephone. At 1306, a certificate provisioning web service is discovered using the telephone and connecting to the web service to download a certificate chain. At 1308, a certificate signing request is comprising created and submitted from the telephone to the web service FIG. 14 illustrates additional aspects of the method of communications of FIG. 12 that employs a certificate. At 1400, the certificate is signed by a communications server. At 1402, after initial registration and for all subsequent registrations, a transport security message is sent that includes a registrar FQDN. At 1404, the certificate is authenticated. At 1406, the telephone is authorized based on the certificate and certificate parameters.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" can be used herein to mean serving as an example, instance, or illustration. Any aspect or design described herein as "exemplary" is not necessarily to be construed as preferred or advantageous over other aspects or designs.

Figure 15:
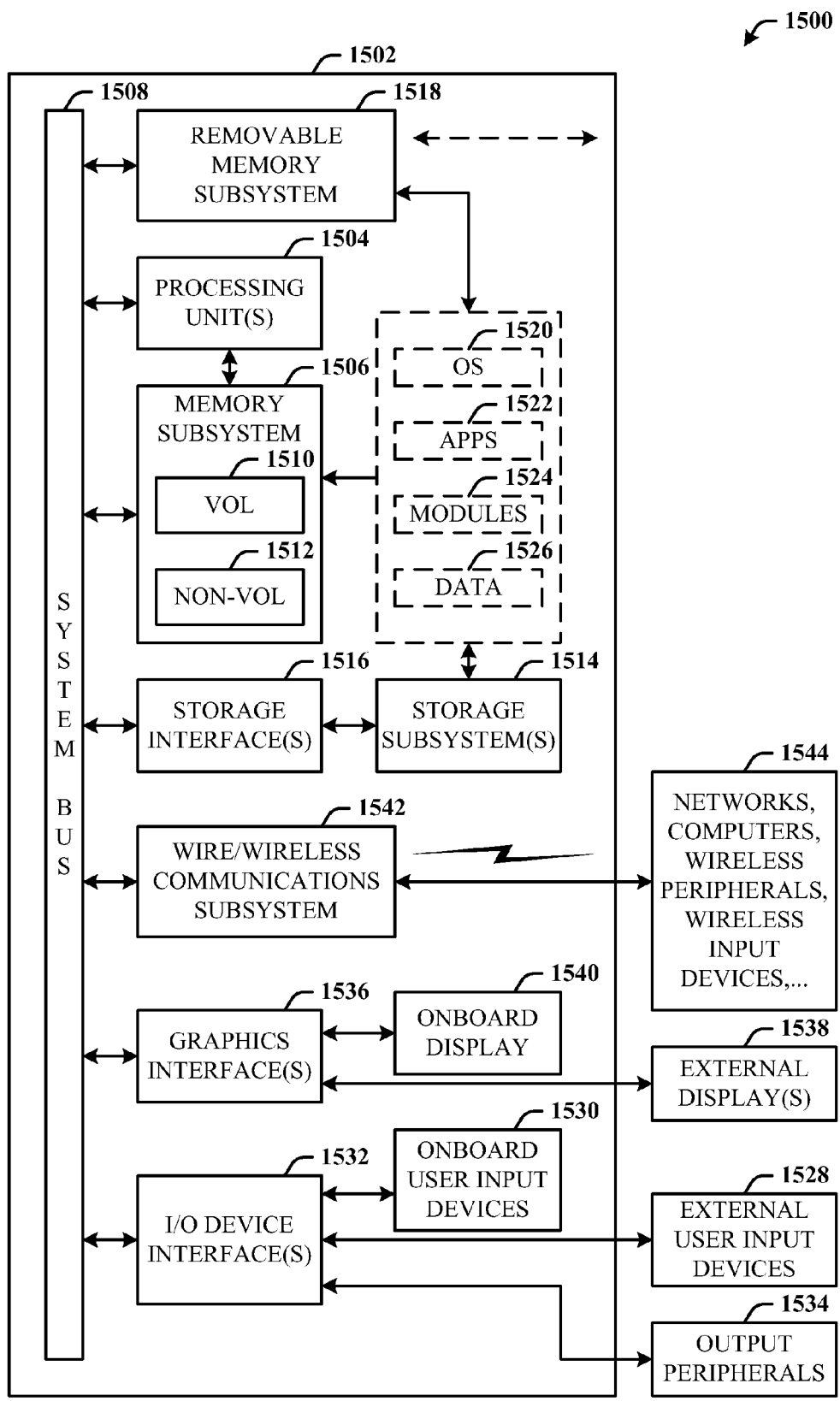
FIG. 15 illustrates a block diagram of a computing system operable to provide user-based authentication in realtime communications in accordance with the disclosed architecture.

Referring now to FIG. 15, there is illustrated a block diagram of a computing system 1500 operable to provide user-based authentication for realtime communications in accordance with the disclosed architecture. In order to provide additional context for various aspects thereof, FIG. 15 and the following discussion are intended to provide a brief, general description of the suitable computing system 1500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1500 for implementing various aspects includes the computer 1502 having processing unit(s) 1504, a system memory 1506, and a system bus 1508. The processing unit(s) 1504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1506 can include volatile (VOL) memory 1510 (e.g., random access memory (RAM)) and non-volatile memory (NON-VOL) 1512 (e.g., ROM, EPROM, EEPROM, etc.). A basic input/output system (BIOS) can be stored in the non-volatile memory 1512, and includes the basic routines that facilitate the communication of data and signals between components within the computer 1502, such as during startup. The volatile memory 1510 can also include a high-speed RAM such as static RAM for caching data.

The system bus 1508 provides an interface for system components including, but not limited to, the memory subsystem 1506 to the processing unit(s) 1504. The system bus 1508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1502 further includes storage subsystem(s) 1514 and storage interface(s) 1516 for interfacing the storage subsystem(s) 1514 to the system bus 1508 and other desired computer components. The storage subsystem(s) 1514 can include one or more of a hard disk drive (HDD), a magnetic floppy disk drive (FDD), and/or optical disk storage drive (e.g., a CD-ROM drive DVD drive), for example. The storage interface(s) 1516 can include interface technologies such as EIDE, ATA, SATA, and IEEE 1394, for example.

One or more programs and data can be stored in the memory subsystem 1506, a removable memory subsystem 1518 (e.g., flash drive form factor technology), and/or the storage subsystem(s) 1514, including an operating system 1520, one or more application programs 1522, other program modules 1524, and program data 1526. Generally, programs include routines, methods, data structures, other software components, etc., that perform particular tasks or implement particular abstract data types. All or portions of the operating system 1520, applications 1522, modules 1524, and/or data 1526 can also be cached in memory such as the volatile memory 1510, for example. It is to be appreciated that the disclosed architecture can be implemented with various commercially available operating systems or combinations of operating systems (e.g., as virtual machines).

The aforementioned application programs 1522, program modules 1524, and program data 1526 can include the computer-implemented system 100, the input component 102, the telephone 104, the identification code 106, the provisioning component 108, and the telephony infrastructure 110 of FIG. 1, the system 200 that includes the provisioning component 108, the SIP URI 202, and the authentication component 204 of FIG. 2, the further additional components 300 such as the enterprise communications server 302, the location component 306, and the IP address 308 of FIG. 3.

The aforementioned application programs 1522, program modules 1524, and program data 1526 can further include the system 400, the input component 102, the user identifier 402, the PIN 404, the certification service 406, the telephone 104, the location component 306, the enterprise communications server 302, the provisioning component 108, and the authentication component 204 of FIG. 4, the additional entities 500 such as the IP server 502, the SIP URI 504, the DHCP server 506, the IP address 508, the FQDN record 510, and the enterprise communications server 302 of FIG. 5, the system 600, the IP telephone 602, the enterprise communications server 302, and the DHCP server 506 of FIG. 6, the data and message flow diagrams of FIGS. 7 and 8, and the methods represented by the flow charts of FIGS. 9-14, for example.

The storage subsystem(s) 1514 and memory subsystems (1506 and 1518) serve as computer readable media for volatile and non-volatile storage of data, data structures, computer-executable instructions, and so forth. Computer readable media can be any available media that can be accessed by the computer 1502 and includes volatile and non-volatile media, removable and non-removable media. For the computer 1502, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1502, programs, and data using external user input devices 1528 such as a keyboard and a mouse. Other external user input devices 1528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1502, programs, and data using onboard user input devices 1530 such a touchpad, microphone, keyboard, etc., where the computer 1502 is a portable computer, for example. These and other input devices are connected to the processing unit(s) 1504 through input/output (I/O) device interface(s) 1532 via the system bus 1508, but can be connected by other interfaces such as a parallel port, IEEE 1394 serial port, a game port, a USB port, an IR interface, etc. The I/O device interface(s) 1532 also facilitate the use of output peripherals 1534 such as printers, audio devices, camera devices, and so on, such as a sound card and/or onboard audio processing capability.

One or more graphics interface(s) 1536 (also commonly referred to as a graphics processing unit (GPU)) provide graphics and video signals between the computer 1502 and external display(s) 1538 (e.g., LCD, plasma) and/or onboard displays 1540 (e.g., for portable computer). The graphics interface(s) 1536 can also be manufactured as part of the computer system board.

The computer 1502 can operate in a networked environment (e.g., IP) using logical connections via a wire/wireless communications subsystem 1542 to one or more networks and/or other computers. The other computers can include workstations, servers, routers, personal computers, microprocessor-based entertainment appliance, a peer device or other common network node, and typically include many or all of the elements described relative to the computer 1502. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which can connect to a global communications network such as the Internet.

When used in a networking environment the computer 1502 connects to the network via a wire/wireless communication subsystem 1542 (e.g., a network interface adapter, onboard transceiver subsystem, etc.) to communicate with wire/wireless networks, wire/wireless printers, wire/wireless input devices 1544, and so on. The computer 1502 can include a modem or has other means for establishing communications over the network. In a networked environment, programs and data relative to the computer 1502 can be stored in the remote memory/storage device, as is associated with a distributed system. It will be appreciated that the network connections shown are exemplary and other means of establishing a communications link between the computers can be used.

The computer 1502 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 16:
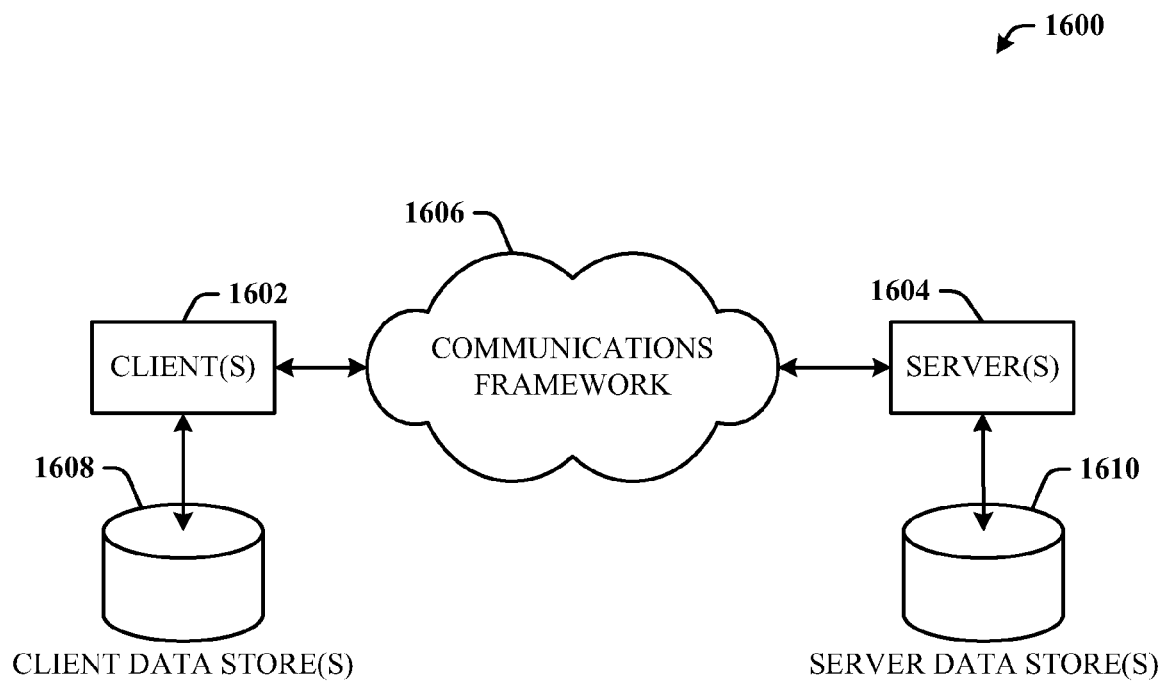
FIG. 16 illustrates an exemplary computing environment operable to provide user-based authentication.

Referring now to FIG. 16, there is illustrated a schematic block diagram of a computing environment 1600 that can be used for user-based authentication. The environment 1600 includes one or more client(s) 1602. The client(s) 1602 can be hardware and/or software (e.g., threads, processes, computing devices). The client(s) 1602 can house cookie(s) and/or associated contextual information, for example.

The environment 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes. The data packet can include a cookie and/or associated contextual information, for example. The environment 1600 includes a communication framework 1606 (e.g., a global communication network such as the Internet) that can be employed to facilitate communications between the client(s) 1602 and the server(s) 1604.

Communications can be facilitated via a wire (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed architecture. It is, of course, not possible to describe every conceivable combination of components and/or methodologies, but one of ordinary skill in the art can recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
   an input component of a telephone for enabling user inputting of a telephone number and a numeric personal identification number (PIN);
   a provisioning component for receiving the telephone number and numeric PIN to look up a username and certificate and provisioning the telephone to a telephony infrastructure based on the username and certificate; and
   a microprocessor that executes computer-executable instructions associated with at least one of input component or the provisioning component.

2. The system of claim 1, further comprising a provisioning component for assigning a session initiation protocol uniform resource identifier (SIP URI) to the telephone and accessing the telephony infrastructure based on the SIP URI and a personal identification number (PIN).

3. The system of claim 1, further comprising an authentication component for authenticating the telephone to the telephony infrastructure based on the telephone number and numeric PIN.

4. The system of claim 1, wherein the telephony infrastructure further comprises an enterprise messaging server for processing Internet protocol (IP) phone voice messages.

5. The system of claim 1, further comprising a location component for providing at least one of an IP address or domain name of the telephony infrastructure to the telephone.

6. The system of claim 1, wherein the telephone number and numeric PIN comprises one of a full phone number or extension number and a PIN.

7. A computer-implemented communications system, comprising:
   an input component for entering a numeric user identifier and PIN from a telephone;
   a location component for providing location information of an enterprise communications server to the telephone based on the extension;
   a provisioning component for provisioning the telephony address of the telephone associated with the numeric user identifier;
   an authentication component for authenticating the telephone based on the PIN;
   a certification component for sending a certificate from the enterprise communications server to the telephone to be used for subsequent authentication; and
   a microprocessor that executes computer-executable instructions associated with at least one of the input component, location component, provisioning component authentication component, or certification component.

8. The system of claim 7, wherein the enterprise communications server further comprises an IP server for IP telephony.

9. The system of claim 7, wherein the telephony address comprises a SIP URI for sending SIP messages to the enterprise communications server.

10. The system of claim 7, wherein the numeric user identifier is one of a personal telephone number or extension and a property of a network identity, and the PIN is pre-assigned.

11. The system of claim 7, wherein the location component further comprises a dynamic host configuration server for returning an IP address and a fully qualified domain name of the enterprise communications server to the telephone.

12. The system of claim 7, wherein the enterprise communications server authenticates the phone using the SIP URI and the PIN.

13. A computer-implemented method of communications, performed by a computer system executing machine-readable instructions, the method comprising acts of:
   authenticating a telephone of a user to a communications network using a user identifier and PIN;
   issuing a certificate to the telephone based on the user identifier and the PIN; and
   registering the telephone to the network using the certificate.

14. The method of claim 13, further comprising provisioning the telephone by sending and storing a public key from the certificate in a database.

15. The method of claim 13, further comprising sending a user SIP URI to the telephone based on the user identifier and the PIN.

16. The method of claim 13, further comprising sending a certificate web service address and registrar FQDN to the telephone.

17. The method of claim 13, further comprising discovering a certificate provisioning web service using the telephone and connecting to the web service to download a certificate chain.

18. The method of claim 17, further comprising creating and submitting a certificate signing request from the telephone to the certificate provisioning web service.

19. The method of claim 13, further comprising signing the certificate by a communications server.

20. The method of claim 13, further comprising:
   after initial registration and for all subsequent registrations, sending a SIP message to a registrar FQDN;
   authenticating the certificate; and
   authorizing the telephone based on the certificate and certificate parameters.

* * * * *